Patented Jan. 15, 1952

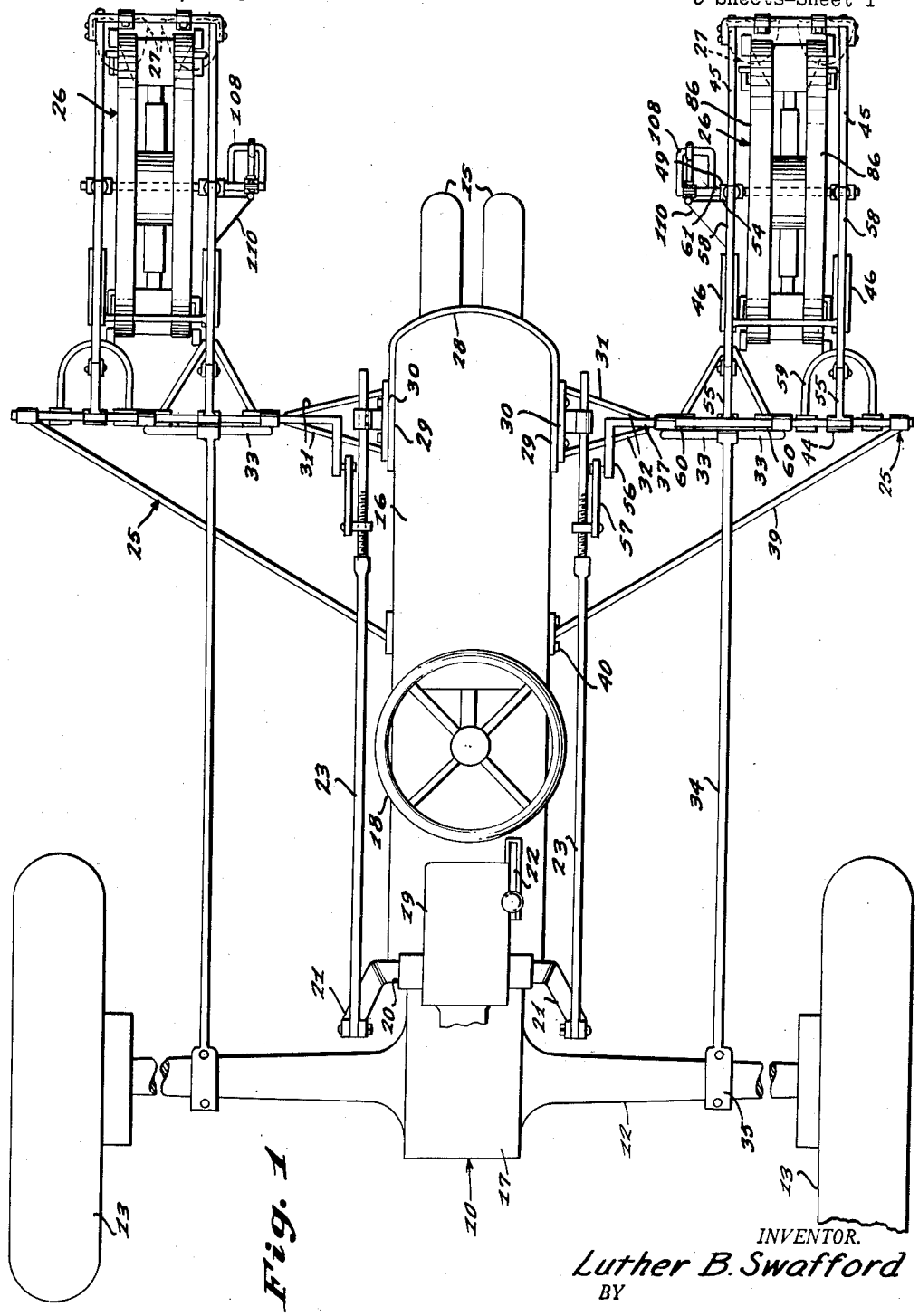

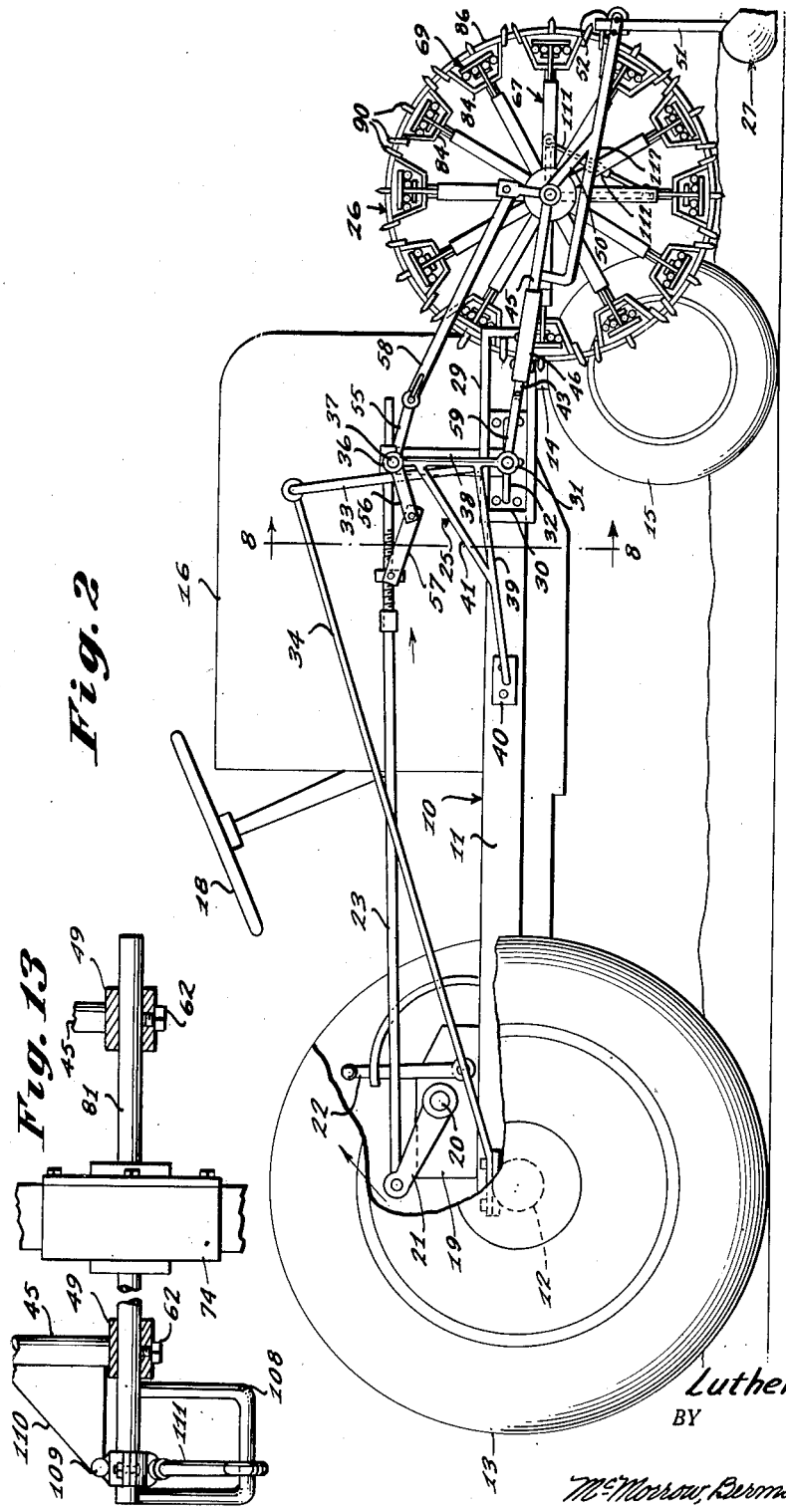

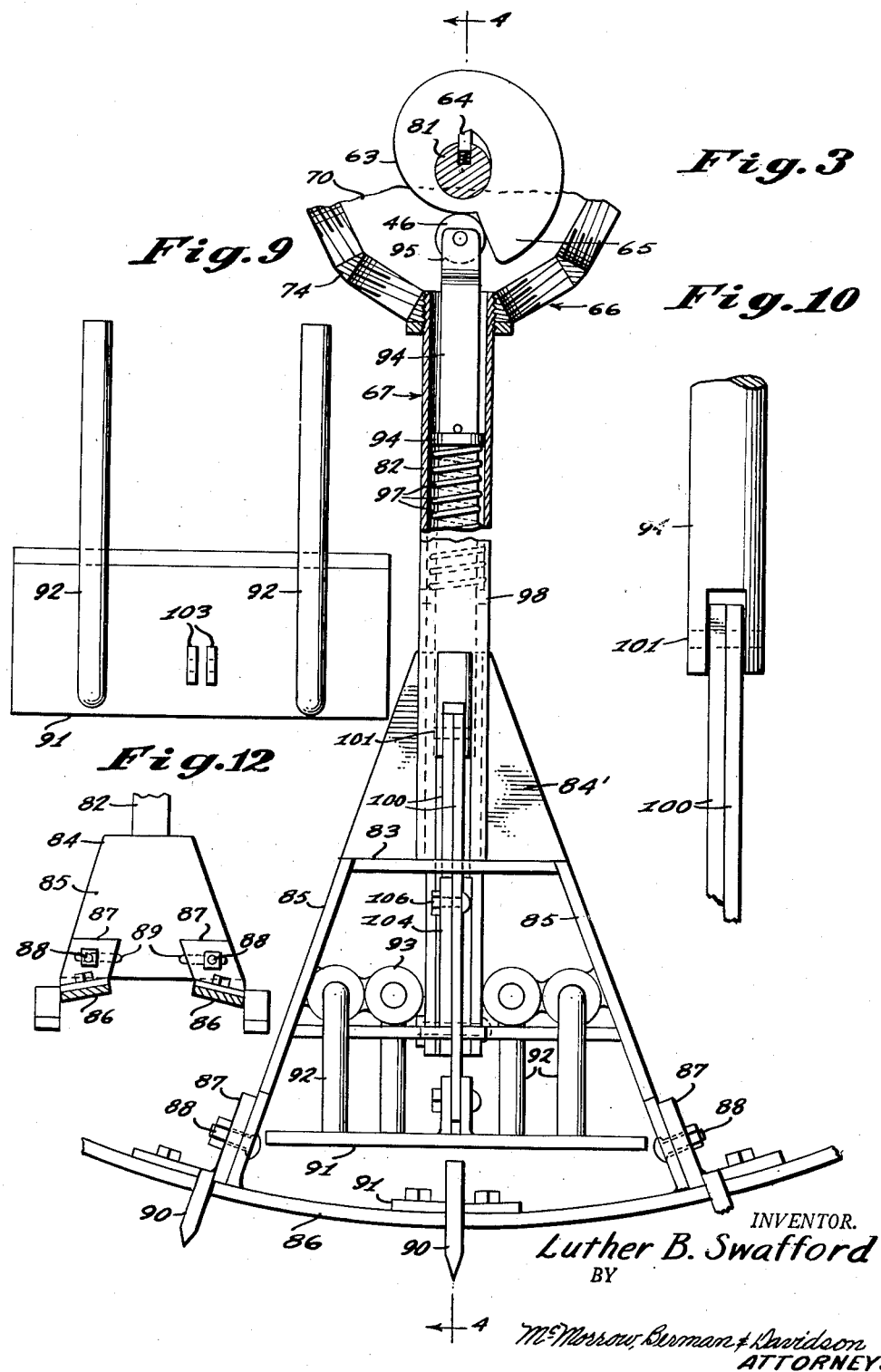

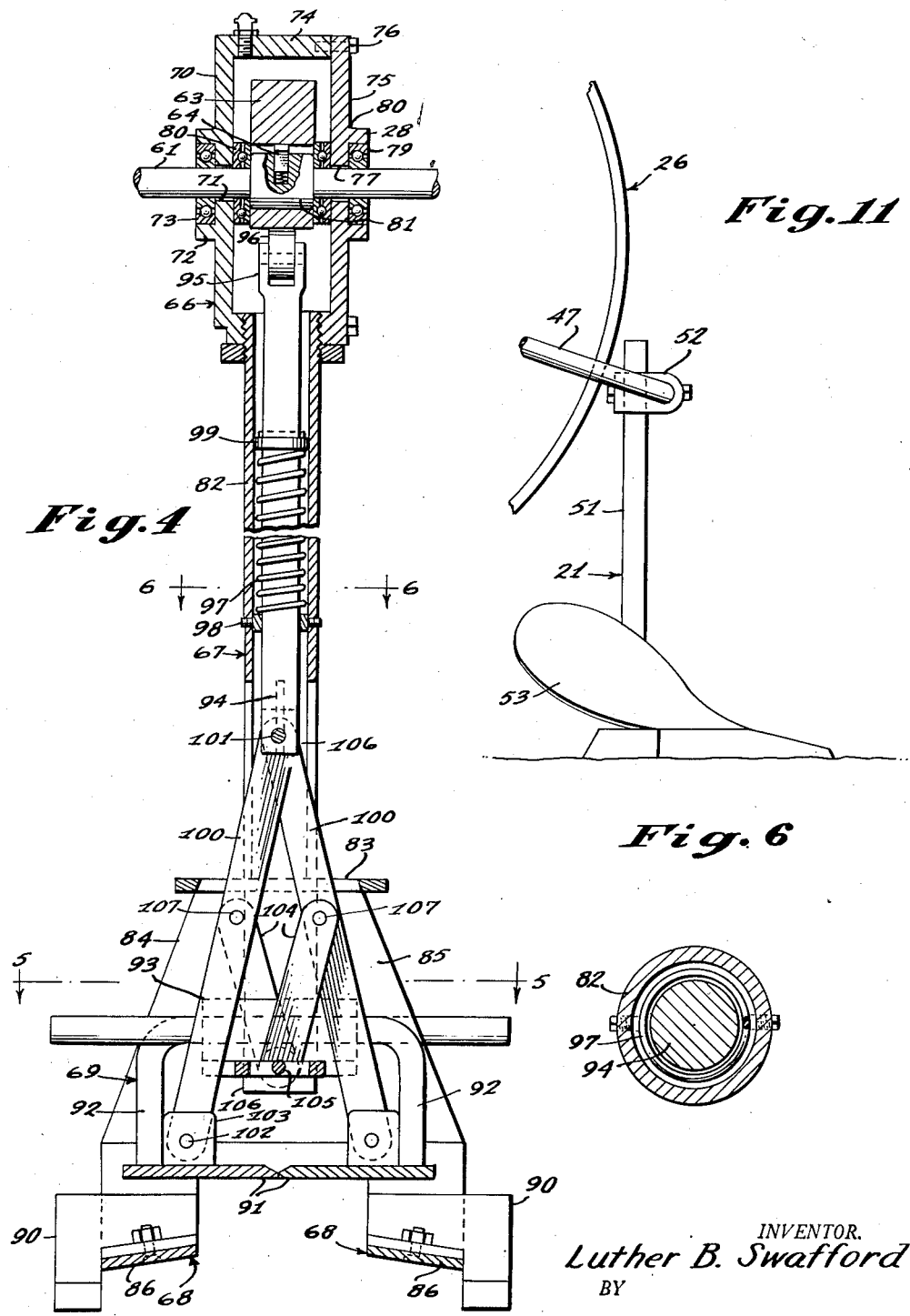

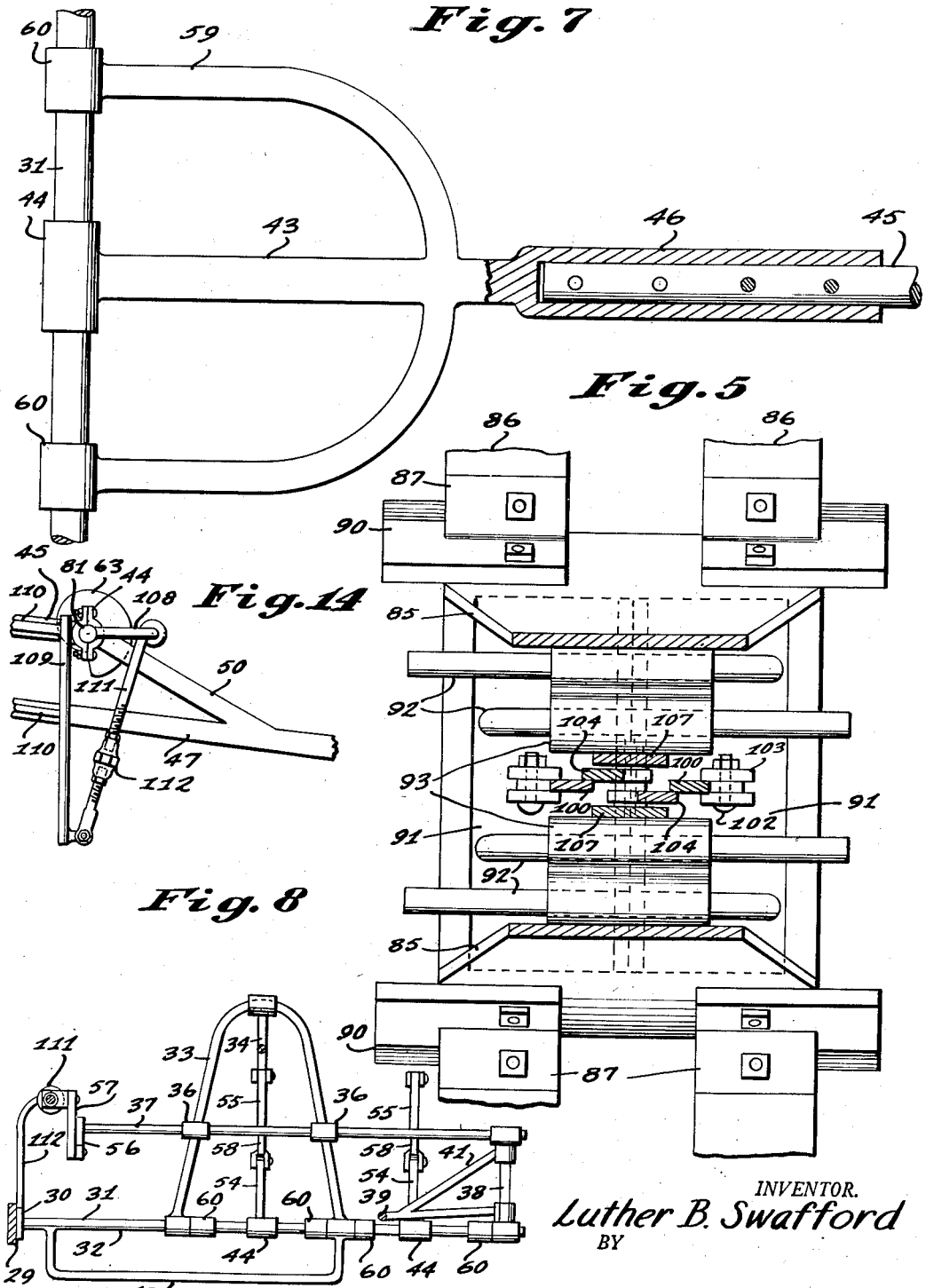

2,582,513

UNITED STATES PATENT OFFICE 2,582,513

PLANT THINNING MACHINE

Luther B. Swafford, England, Ark.

Application June 29, 1948, Serial No. 35,945

4 Claims. (Cl. 97—22)

This invention relates to improvements in agricultural implements, and more particularly to improved tractor attachments for cultivating and "chopping" or thinning row crops, such as cotton.

It is among the objects of the invention to provide an improved cotton chopping and cultivating attachment for a farm tractor, which attachment is effective to shape the rows or ridges in which the cotton plants grow, mechanically cut off and destroy the plants at spaced-apart intervals along the row to thin the plants and restrict them to uniformly-spaced hills, which severs the plants at or slightly below the surface of the ground to avoid recurrence of growth of the severed plants, which is fully automatic in operation, adjustable to different row spacings, easily applied to and removed from a conventional tractor and operatively connected to the implement mechanism of the tractor, which cultivates and thins two rows of plants at the same time and which is strong, rigid and durable in construction and extremely economical to manufacture.

Other objects and advantages will become apparent from a consideration of the following description and the appended claims, in conjunction with the accompanying drawings, wherein:

Figure 1 is a top plan view of a conventional farm tractor with a crop-thinning and cultivating attachment illustrative of the invention operatively applied thereto;

Figure 2 is a side elevation of the tractor and attachment illustrated in Figure 1;

Figure 3 is a side elevation of a fragmentary portion of a cultivating and thinning wheel constituting an operative component of the improved attachment, a portion being broken away and shown in cross section to further illustrate the construction thereof;

Figure 4 is a vertical cross-section taken substantially on the line 4—4 of Figure 3;

Figure 5 is a transverse cross-section taken substantially on the line 5—5 of Figure 4;

Figure 6 is a transverse cross-section taken substantially on the line 6—6 of Figure 4;

Figure 7 is a top plan view of an enlarged scale of a fragmentary portion of the attachment frame illustrating a structural detail of the frame, a portion being broken away and shown in cross section to better illustrate the construction thereof;

Figure 8 is a rear elevation of the right-hand frame of the attachment;

Figure 9 is a top plan view of one of the chopper blades, of the improved chopping and cultivating attachment;

Figure 10 is a vertical elevation of a fragmentary portion of the chopper blade operating mechanism of the improved attachment;

Figure 11 is a side elevation of a ridge scraper operatively secured to the front end of an attachment frame;

Figure 12 is a transverse cross-section of a fragmentary portion of a chopping wheel constituting an operative component of the attachment and shows in detail the manner in which the tires of the wheel are adjustably connected to the spoke formation;

Figure 13 is a diagrammatic cross-section of fragmentary portions of the wheel and wheel-supporting frame showing the manner in which the wheel is adjustably mounted in the frame; and Figure 14 is a side elevation of a fragmentary portion of the machine showing in end elevation a timing device for one of the chopping wheels.

With continued reference to the drawings, the tractor, generally indicated at 10, may be any conventional farm tractor ordinarily used to cultivate row crops, such as cotton. This tractor has a longitudinal frame 11 supported at one end by a rear axle 12 upon which are mounted the rear traction wheels 13 disposed one at each end of the rear axle and outwardly spaced from the tractor frame, and supported at its front end on a column 14 provided at its lower end with a transverse axle upon the ends of which are journaled the two closely spaced front wheels 15. The tractor is provided with an engine 16 and the conventional drive mechanism including the differential mechanism 17, a steering wheel 18 and a hydraulic implement lift mechanism 19 including the transverse shaft 20 having crank arms 21 disposed one at each end thereof and controlled by a manually-operated lever 22.

The tractor normally carries two sets of cultivating plows or hoes, not illustrated, between the front and rear wheels, which plows are pivotally connected to the tractor frame 11 and operatively connected to the crank arms 21 of the hydraulic lift by elongated links 23 disposed one at each side of the tractor frame and spaced outwardly therefrom.

As the above-described tractor mechanism is all conventional, and may vary in detail with tractors of different manufacture, a detailed description of the tractor, the cultivating plows or hoes and the operative connections between such plows and the tractor, is not considered to be necessary for the purposes of the present disclosure.

The improved chopping or thinning and cultivating attachment comprises two substantially identical frames, generally indicated at 25, disposed one at each side of the tractor and projecting laterally therefrom, two substantially identical chopping or thinning wheels, generally indicated at 26, carried by the frame 25, and two pair of ridge or row scrapers, generally indicated at 27, also carried by the frames in advance of the wheels 26. Also, if desired, a frame attachment band 28 may be secured around the front end of the tractor frame to suitably reinforce the tractor and facilitate the attachment of the frames 25 thereto. This band 28 may have an arcuately-curved bight or intermediate portion extending across the front end of the tractor frame and a pair of spaced-apart, parallel legs 29 extending along the sides of the frame adjacent the front end thereof to receive the attachment plates of the wheel-carrying frames 25.

Each of the frames 25 includes a portion rigidly attachable to the frame of the tractor or other vehicle provided to support the attachment, and a movable portion hinged to and projecting forwardly of the rigidly-mounted frame portion. The rigidly-mounted portion of each frame is adequately braced or trussed for rigidity and comprises a flat plate 30 secured to the tractor frame or to the corresponding leg 29 of U-shaped band 28, an elongated, cylindrical strut 31 secured at one end to the attachment plate and projecting outwardly therefrom, and a pair of angularly-disposed, outwardly-converging braces 32 secured at their outer ends to strut 31 intermediate the length of the latter and at their inner ends to corresponding ends of attachment plate 30. The struts of the two frames are disposed substantially in alignment with each other and extend horizontally from the corresponding sides of the tractor frame substantially perpendicular to the longitudinal center-line of the tractor. A U-shaped yoke 33 has the ends of its legs at the open end thereof rigidly secured to strut 31 and extends upwardly from the strut. One leg of the yoke is attached to the strut adjacent the outer ends of braces 32 and the other leg is attached at a location substantially at the mid-length position of that portion of the strut which exends outwardly from the braces. An elongated tie rod 34 is attached to the upper closed end of yoke 33 and extends rearwardly to the corresponding end of the rtactor rear axle 12 to which it is attached by suitable means, such as the clamp 35. A pair of aligned bearing sleeves 36 are supported by yoke 33, one on each leg thereof and a shaft 37 is journaled in these bearing sleeves and is disposed above and substantially parallel to strut 31. A substantially-vertical post 38 extends between the outer end of strut 31 and the outer end of shaft 37, and an angularly-disposed brace 39 extends from the lower end of this post to the tractor frame at a location spaced rearwardly of attachment plate 30. The end of brace 39 may be connected to the tractor frame by a suitable attachment plate 40 secured to the tractor frame and to the corresponding end of the brace. A secondary brace 41 extends from a location on brace 39 intermediate the length thereof to the upper end of post 38 to rigidly support the post in upright position. The braces 32, 34, 39 and 41 thus rigidly support the strut 31 and the shaft 37 in a position substantially perpendicular to the longitudinal center-line of the tractor and with the center-line of the strut and the shaft in an upright, substantially vertical common plane. A brace 42 extending below strut 31 from plate 30 to the end of the outer leg of yoke 33, supports the strut in substantially horizontal position and provides the strength necessary to lift and carry the corresponding wheel 26 without materially deflecting the rigid portion of the frame.

The movable portion of the frame comprises a pair of parallel frame arms 43 pivotally or hingedly secured to strut 31 by suitable means, such as the bearing sleeves 44 receiving the strut and rigidly secured to the corresponding ends of the frame arms, a pair of cylindrical sleeves 46 secured one to the outer end of each arm 43, a pair of arm extensions 45 telescopically received, one in each sleeve, and a U-shaped guard 47 secured to and extending outwardly of the extension arms 45. Each of the cylindrical sleeves 46 is provided with a series of spaced-apart set screw apertures by means of which the extension arms are adjustably secured in the sleeves to vary the length of the movable portion of the frame to accommodate wheels of different diameters when necessary or desirable. The U-shaped guard 47 is positioned somewhat below the extension arms 45, and has upwardly bent leg portions at its open end attached to the extension arms near the sleeve received portions of the extension arms. A respective cylindrical axis sleeve or bushing 49 is secured to the outer end of each extension arm 45, and outwardly and downwardly-inclined braces 50 extend from these bushings to the legs of the guard 47 to rigidly attach the guard to the extension arms of the movable portion of the frame. Standards 51 are secured one to each leg of the guard 47 adjacent the outer end thereof by suitable clamps 52 and a respective scraper 53 is secured to the lower end of each substantially vertical standard 51. These scrapers may be in the form of discs journaled to the lower ends of the standard or may be in the form of suitable scraper plow shares, as may be desired.

A short post 54 extends upwardly from each axle bushing 49 and a pair of crank arms 55 projects radially from shaft 37 substantially in alignment with posts 54. A crank arm 56 is secured on the inner end of shaft 37 and is adjustably connected to the externally screw-threaded extension 110 of the plow lift bar 23 by a pivoted link 57 to render the bar effective to rotate shaft 37 when moved forwardly by the implement lift mechanism of the tractor. Lift bar extensions 110 are each slidably supported in an eye 111 carried at the top of a respective upright standard 112 secured to attachment plate 30. Respective links 58 connect the crank arms 55 with corresponding posts 54 so that when shaft 37 is rotated the front end of the movable portion of the frame will be pivoted upwardly about the bearing sleeves 44, thereby raising the axle bushings 49 and the wheels supported thereby.

The frame arms 43 are held against lateral movement by respective U-shaped braces 59 secured at their mid-length locations to the arms 43 and at their ends to strut 31 by suitable bearing sleeves 60.

An axle 61 extends through the axle bushings 49 and is releasably secured therein against lengthwise movement by suitable means, such as the set screws 62 threaded through suitable apertures in the bushings and bearing at their inner ends against the axle. A flat cam 63 has an aperture therethrough receiving axle 61 and is secured on the axle against rotation relative thereto by suitable means, such as the key 64. This cam is partly circular and concentric with the axle-receiving aperture, but has a radially-extending lobe 65 which projects downwardly when the cam is mounted in operative position on the frame, and has a curved forward side and a substantially straight, radial rear side.

Each wheel, generally indicated at 26, comprises a hub structure, generally indicated at 66, a plurality of radially-extending, angularly-spaced spoke structures, as generally indicated at 67, a tire structure, generally indicated at 68, and a chopping blade mechanism operatively associated with each spoke structure, and generally indicated at 69.

Hub structure 66 comprises a hollow housing 70 having an end wall provided with a concentric, axle-receiving aperture 71 and an external annular boss 72 concentric with aperture 71 and receiving a radial anti-friction bearing 73 the inner race of which is secured on axle 61, and an annular wall 74 of circular shape extending from the rim of end wall 70 and having radially-directed, internally screw-threaded spoke-receiving sockets 74' therein. A detachable circular end wall 75 is secured to the open end of the housing by suitable means, such as the cap screws 76 and has a central, axle-receiving aperture 77 and an annular external boss 78 receiving radial anti-friction bearing 79. The hollow housing is thus journaled on axle 61 by the radial anti-friction bearings 73 and 79. The two end walls of the housing are disposed one at each side of cam 63 and the housing is maintained against movement lengthwise of the axle by a pair of anti-friction thrust bearings 80 disposed one between each housing end wall and the corresponding ends of a cylindrical enlargement 81 provided at the mid-length location of axle 61 and received in the axle-receiving aperture of cam 63.

Each of the spoke structures 67 incluudes a tubular member 82 secured at its inner end in the annular wall 74 of hub structure 66 and secured at its outer end to the bight portion 83 of a U-shaped bracket 84 and reinforced by welded-on webs 84'. The two legs 85 of the U-shaped bracket 84 comprise flat plates which extend transversely of the wheel and relatively diverge in a direction away from the end or bight portion 83. The side edges of these plates also diverge in a direction away from the bight portion, as is clearly illustrated in Figure 4, and the end edges of the legs are spaced apart a distance substantially equal to the desired spacing between hills of the row crop which the implement is used to thin.

The tire structure 68 comprises a pair of annular tires 86 of generally conical shape including radially inwardly in a direction toward each other. These tires are spaced apart to straddle the plants in a row and are adjustably secured to the spoke structure brackets 84 by suitable means, such as the apertured angle brackets 87 secured to the tires 86 respectively, and bearing against the outer sides of the legs 85 of the U-shaped brackets 84 and the bolts 88 extending one through each angle bracket 87 and through a transversely-elongated slot 89 in the leg of the U-shaped bracket, as clearly illustrated in Figure 12. In operation, the tires 86 are used to flatten and compact the soil along the two opposite sides of each row of plants and the distance between the two tires is made adjustable since it is desirable to space the compacted area from the plants by different distances incident to the size of the plants and other factors. Each tire 86 has a plurality of ground-engaging cleats 90 secured to its outer edge so that even rotation of the thinning or chopping wheels will be maintained at all times. These cleats are preferably formed integrally with or permanently secured to the tire-attaching angle brackets 87 for facility in the construction and assembly of the device, although intermediate cleats may be secured to the tires by special brackets 91 disposed midway between each two adjacent angle brackets 87, if desired.

Each unit 69 of the chopping or thinning mechanism comprises a pair of flat, opposed plates or blades 91 having beveled inner edges, one pair of such plates being disposed within each U-shaped bracket 84 of each of the several spoke structures in the wheel. In the wheel illustrated in Figure 2, there are twelve such spoke structures, but this number may be varied as may be found necessary or desirable. Each blade 91 is secured at its upper or inner side and adjacent its outer end to a pair of parallel angle bars 92, each having a portion substantially perpendicular to the plate to which it is attached and a portion substantially parallel to such plate and extending beyond the inner beveled edge of the corresponding plate. The outer portions of these angle bars parallel to the blades are slidably received in spaced-apart, transverse apertures provided in a generally rectangular body 93 extending between the legs 85 of the U-shaped bracket 84 and secured at its ends thereto at approximately the mid-length positions of the legs. The angle bars 92 thus guide the blades for reciprocating movements toward and away from each other so that the blades may be forced apart to allow plants to pass therebetween, or may be brought together to sever the plants at a particular location in the row. These blades are spaced inwardly of the tires 86 a distance such that they normally pass through the ridge of the row slightly below the upper surface of the ridge. An elongated, cylindrical plunger 94 is slidably mounted in the tubular portion 82 of the axle structure and is provided at its upper end with an apertured bifurcation or fork 95 in which is journaled a roller 96, preferably an anti-friction bearing, bearing peripherally on the outer surface of cam 63. With this construction, the plunger 94 is forced outwardly of the spoke structure by the cam lobe 65 each time the wheel rotates about the cam. When roller 96 passes over the tip of the cam lobe and reaches a position along the flat side of the lobe, the plunger is forced inwardly by a suitable compression spring 97, which surrounds the plunger between an annular abutment collar 98 secured in the tubular portion of the spoke structure and a collar 99 secured on the plunger inwardly of the collar 98. It will be noted in Figure 3 that the tip of the cam lobe 65 is displaced somewhat ahead, in the direction of wheel rotation, of a vertical line extending through the axis of rotation of the wheel so that the roller 96 may move inwardly to bring the blades 91 together co-incidentally with the particular spoke structure reaching a substantially vertical position as the wheel rotates.

The lower end of plunger 94 is operatively connected to the blades 91 by a pair of links 100, pivotally connected at their inner ends to the outer end of the plunger by a pivot pin 101 extending through aligned apertures in the corresponding ends of the links and the plunger, and pivotally connected at their outer ends to the respective blades 91 by pins 102 extending through aligned apertures in the outer ends of the links and in respective bracket plates 103 secured one to each of the blades 91.

A pair of spreader links 104 are pivotally connected at their outer ends by a common pivot pin 105 to the outer ends of a pair of parallel extensions 106, extending from the tubular portion 82 of the spoke structure through the inner portion of the bracket 84, and are pivotally connected at their inner ends respectively to the two links 100 by respective pivot pins 107.

With this construction, after the roller 96 has passed the tip of the cam lobe and then moved inwardly by the spring 97, the contour of the cam gradually forces the plunger outwardly of the spoke structure, spreading the links 100 and 104 and thereby separating the blades 91 so that the plants in the row may pass between the blades until the roller again passes over the tip of the cam lobe and the blades are brought sharply together by the stored energy of spring 97. The diameter of the wheel is selected and the spoke structures are angularly spaced so that the chopping action will take place at the desired intervals along the row, thereby thinning the crop, such as cotton, into equally-spaced hills having a desired number of plants in each hill.

The operation of the chopping mechanism is timed by rotationally adjusting the corresponding axles 81 and associated cams 63. For this purpose a respective arm or loop 108 is secured to and projects perpendicularly outward from each axle, preferably adjacent the inner end thereof. A substantially vertical post 109 is rigidly secured to the adjacent frame members 45 and 47 near the inner end of each axle by suitable means, such as the gusset plates or braces 110 and extends downwardly below the axle, and an adjustable link 111 is pivotally connected at its lower end to the lower end of post 109 and at its upper end to the outer end of loop 108. Link 111 comprises two arms disposed in longitudinal alignment with respective eyes on their outer ends pivotally connected to the post and loop respectively and externally screw threaded adjacent ends connected by an internally screw-threaded twin buckle 112, so that the link can be lengthened or shortened to adjustably rotate the axles and associated cams.

The timing devices are also effective to hold the axles and associated cams in adjusted position against accidental rotation.

In the operation of the entire mechanism, as the tractor passes along the rows of plants the conventional plows or hoes cultivate the middles of the rows loosening the soil and destroying weeds, the two pair of scrapers pass along the two rows being cultivated, one scraper being disposed at each side of each row, to trim the ridges to a desired cross-sectional shape, and the tires of the wheels then pass along the upper surfaces of the ridges flattening and compacting the earth around the roots of the plants. As the wheels pass along the rows the chopper mechanisms operate continuously and automatically to destroy the unwanted plants, and leave hills spaced apart a desired distance and with a desired number of plants remaining in each hill, this operation being necessary because of the necessity of planting a much greater number of seed than the desired number of plants in order to be sure that a sufficient number of plants will sprout and mature. This chopping or thinning operation is, of course, carried out while the plants are still in an early stage of growth, the plants removed making room for the growth of the retained plants and the total number of plants being reduced to a figure which the soil will adequately support.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A cotton chopper wheel comprising a hub structure, angularly-spaced spokes projecting radially from said hub structure, U-shaped brackets secured to the outer ends of corresponding spokes, a pair of spaced-apart, conically-shaped tires secured to said brackets, a pair of oppositely-disposed chopping blades in each bracket, means mounting each pair of blades on the corresponding bracket for movement of such blades toward and away from each other, cam-operated means extending along the corresponding spokes to each pair of blades to successively move the blades apart as said wheel rotates, and spring means operatively connected to the respective cam-operated means to successively move said blades together after they have been moved apart by said cam-operated means.

2. A cotton chopper wheel comprising a hub structure, a pair of conically-shaped, spaced-apart tires concentric with said hub structure, angularly- spaced-apart spokes projecting radially from said hub structure, U-shaped brackets connecting said tires to the outer ends of said spokes, a pair of chopper blades mounted within each of said brackets for movement toward and away from each other, and a reciprocatory plunger operatively connected to each pair of blades for effecting the movement of the latter.

3. A cotton chopper wheel comprising a hub structure, a plurality of spokes projecting radially from said hub structure, bracket means arranged adjacent each of the outer ends of said spokes and secured thereto, spaced apart tires concentric with said hub structure and fixedly secured to said bracket means, a pair of chopper blades mounted within each of said bracket means for movement toward and away from each other, and a reciprocatory plunger operatively connected to each pair of blades for effecting the movement of the latter.

4. A cotton chopper wheel comprising a hub structure, a plurality of spokes projecting radially from said hub structure, bracket means arranged adjacent each of the outer ends of said spokes and secured thereto, spaced apart tires concentric with said hub structure and fixedly secured to said bracket means, a pair of chopper blades mounted within each of said bracket means for movement toward and away from each other, cam operated means operatively connected to each pair of blades for effecting the movement of said blades away from each other, and spring means operatively connected to said cam operated means for effecting the movement of each pair of blades toward each other.

LUTHER B. SWAFFORD.

REFERENCES CITED

The following references are of record in the file of this patent:

UNITED STATES PATENTS

| Number | Name | Date |
|---|---|---|
| 394,821 | Deshozo | Dec. 4, 1888 |
| 871,035 | Head | Nov. 12, 1907 |
| 1,760,336 | Benjamin | May 27, 1930 |
| 1,813,631 | Minor | July 7, 1931 |